United States Patent [19]

Timm

[11] Patent Number: 5,287,796
[45] Date of Patent: Feb. 22, 1994

[54] CONTAINER FOR THE PREPARATION OF HOT DRINKS

[76] Inventor: Eberhard Timm, Rahheideweg 15, D-2114 Appel, Fed. Rep. of Germany

[21] Appl. No.: 764,830

[22] Filed: Sep. 24, 1991

[30] Foreign Application Priority Data

Oct. 4, 1990 [DE] Fed. Rep. of Germany ....... 9013838

[51] Int. Cl.$^5$ ........................ A47J 31/10; A47J 31/30
[52] U.S. Cl. ......................................... 99/282; 99/299
[58] Field of Search ................ 99/281, 282, 280, 283, 99/316, 317, 318, 299, 319, 295, 297, 322; 251/11; 426/433

[56] References Cited

U.S. PATENT DOCUMENTS

| | | | |
|---|---|---|---|
| 2,292,853 | 8/1942 | Wilcox | 99/282 |
| 2,498,386 | 2/1950 | Alexander | 99/282 |
| 2,856,843 | 10/1958 | Miklas | 99/282 |
| 3,423,209 | 1/1969 | Weber | 99/282 |
| 3,804,134 | 4/1974 | Wehking | 141/98 |
| 4,997,015 | 3/1991 | Johnson | 99/279 |

FOREIGN PATENT DOCUMENTS

| | | |
|---|---|---|
| 0382001 | 8/1990 | European Pat. Off. |
| 1404799 | 12/1968 | Fed. Rep. of Germany |
| 2212283 | 9/1973 | Fed. Rep. of Germany |
| 2579880 | 10/1986 | France |

OTHER PUBLICATIONS

European Search Report for 91 11 6360.
European Search Report for DE 9013838.

*Primary Examiner*—Robert W. Jenkins
*Assistant Examiner*—Reginald L. Alexander
*Attorney, Agent, or Firm*—Chilton, Alix & Van Kirk

[57] ABSTRACT

The container which can be inserted into a power-supply unit (17, 18) and is intended for the preparation of hot drinks, with a liquid-storage container (4), an electric heating element (7) arranged therein and a collecting container (1) for the drink prepared, the liquid-storage container (4) having a closure (9, 10) which is arranged in the bottom (8) of the liquid-storage container (4) and opens in a manner not automatically reversible at a predetermined internal pressure of the container, due to the arching outwards of the bottom (8), which is provided with contacts (6) for the supply of electrical power and which can be inserted or is inserted into the collecting container (1) in such a way that, in the operating position, the collecting space is essentially below the storage container (4), and the power supply to the heating element (7) being designed in such a way that it is interrupted when the closure (9, 10) is opened, is distinguished by the fact that the closure (9, 10) is formed by an annular projection (9) surrounding an opening of the bottom (8) and by a spike (10) secured in the interior of the liquid-storage container (4), and in that seals (12) are arranged on the projection (9) and/or spike (10).

21 Claims, 9 Drawing Sheets

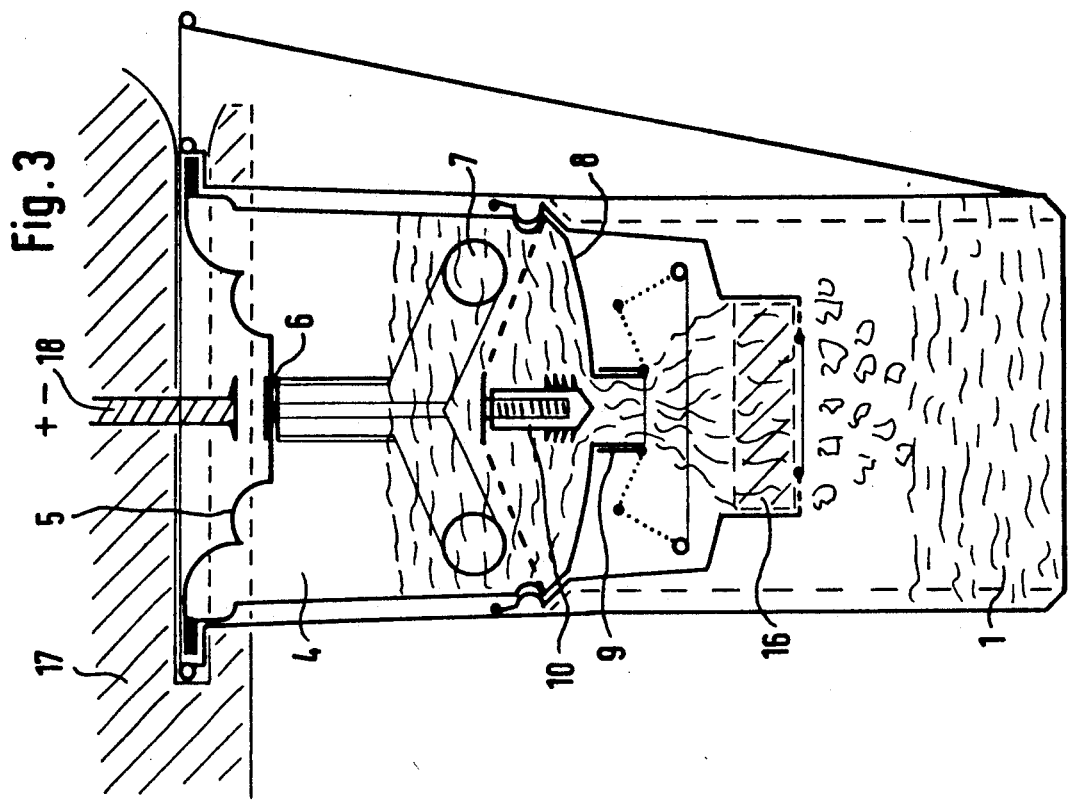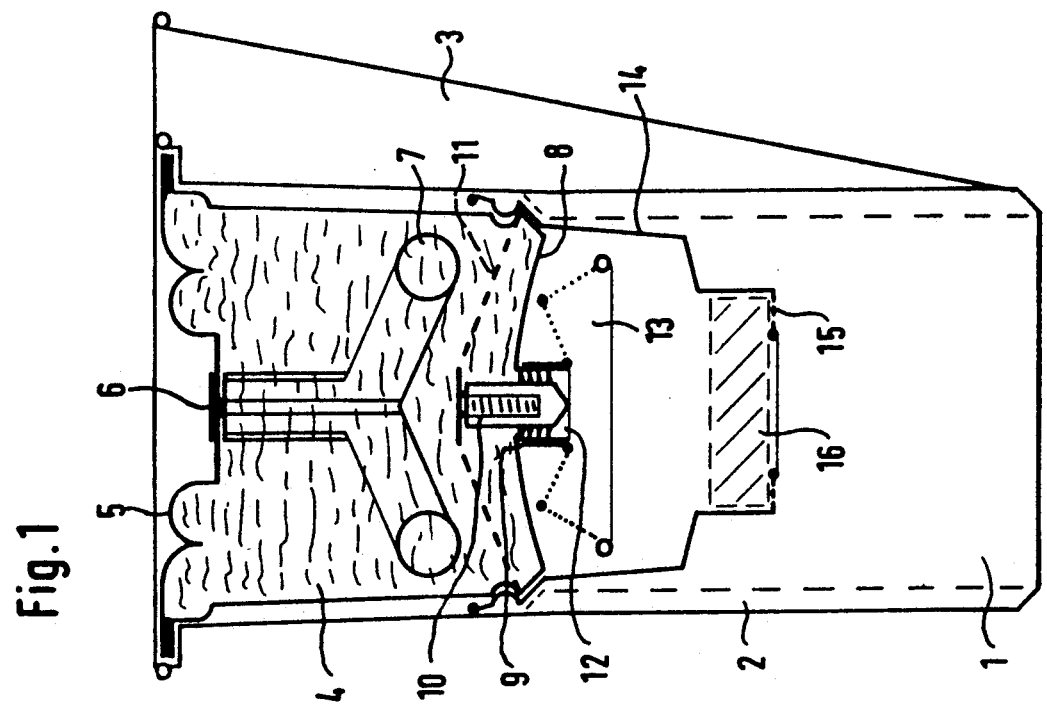

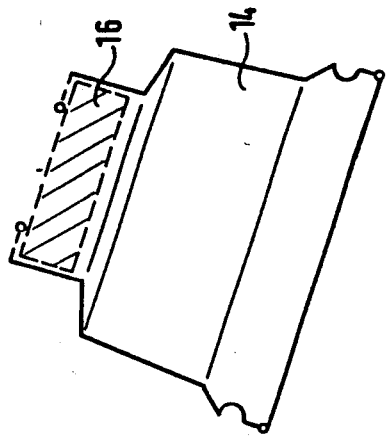
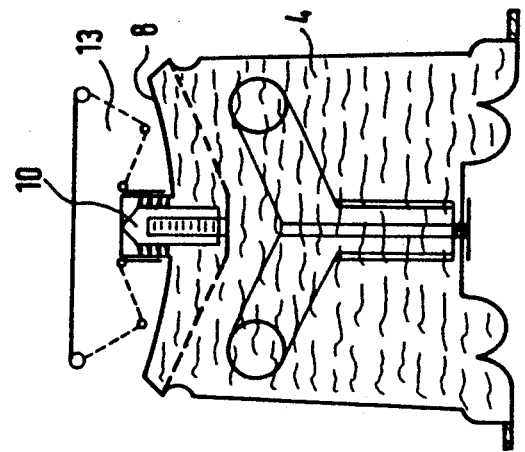
Fig.5
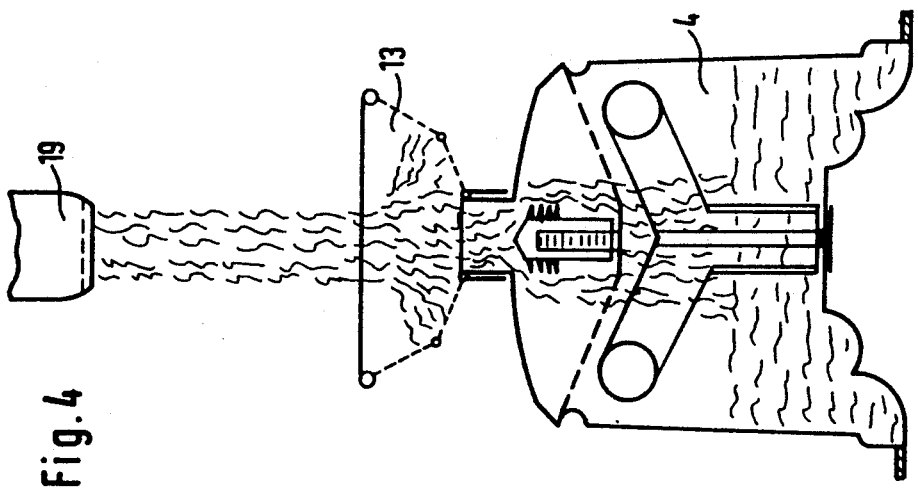
Fig.4

Fig. 6
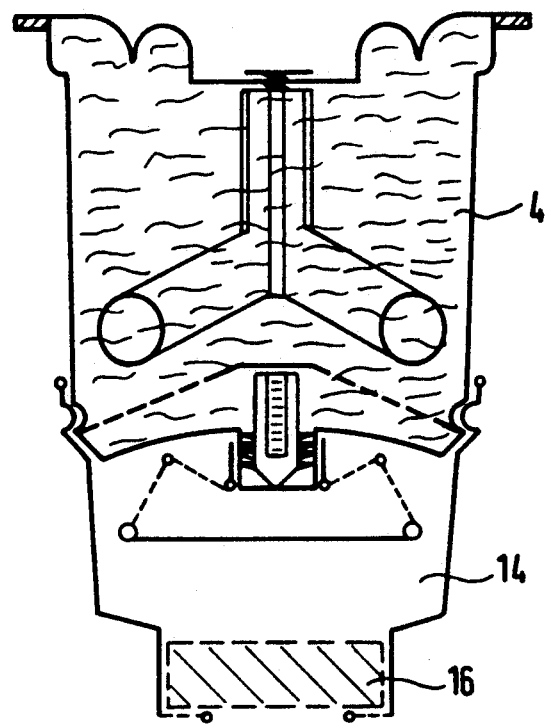
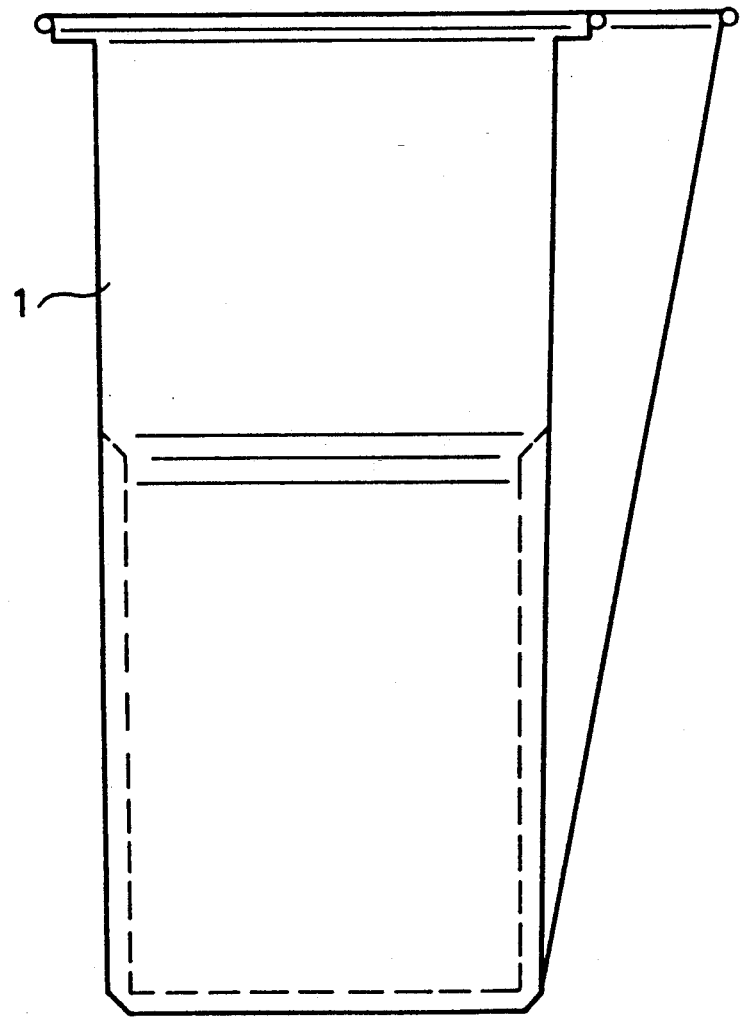

CONTAINER FOR THE PREPARATION OF HOT DRINKS

The invention relates to a container which can be inserted into a power-supply unit and is intended for the preparation of hot drinks, with a liquid-storage container, an electric heating element arranged therein and a collecting container for the drink prepared, the liquid-storage container having a closure which is arranged in the bottom of the liquid-storage container and opens in a manner not automatically reversible at a predetermined internal pressure of the container, due to the arching outwards of the bottom, which is provided with contacts for the supply of electrical power which are connected to the heating element via an electric lead, and which can be inserted or is inserted into the collecting container in such a way that, in the operating position, the collecting space is essentially below the storage container, and the power supply to the heating element being designed in such a way that it is interrupted when the closure is opened.

Known containers of this type (EP-A-0 382 001) can be introduced into a power-supply unit. A liquid, normally water, is then heated in the container. The heating causes the internal pressure in the container to increase, with the result that the bottom of the liquid-storage container arches outwards and a closure arranged in the bottom opens, with the result that the hot liquid comes into contact with the brewing medium or material to be brewed. The hot drink prepared in this way then collects in the collecting space below the liquid-storage container and can be drunk via a lateral opening or (in the case of a soup) eaten with a spoon after the container has been removed from the power-supply unit and the liquid-storage container has been separated from the collecting container.

In the embodiment already disclosed, the closure has a fixed spike which is surrounded by an opening in the bottom, the said opening being provided with a seal. However, such a seal cannot operate satisfactorily, particularly in the case of prolonged storage.

It is therefore the object of the invention to provide a container which can be sealed off better in the region of the closure.

The solution according to the invention consists in the fact that the closure is formed by an annular projection surrounding an opening of the bottom and by a spike secured in the interior of the liquid-storage container, and in that seals are arranged on the projection and/or spike.

Thus there is no longer a more or less linear sealing face between the bottom and the spike but instead a larger region between the annular projection and the spike, between which suitable seals, especially lip seals or rolling ring seals, are arranged.

A further advantage, that the spike is arranged in the liquid-storage container and not, as in the embodiment already disclosed, outside the latter, consists in the fact that the material to be brewed no longer has to be arranged in a ring around the spike but can have the shape of a cylinder similar to a tablet. A further advantage is the smaller number of individual parts in the assembly of the container, making it possible for this container to be of reusable design and to be refilled for future use, after appropriate cleaning, by the user himself.

Advantageously, a cup-shaped element with the material to be brewed is mounted at the bottom of the liquid-storage container, which element should be mounted releasably if the container is to be filled by the user himself. At the bottom of the annular projection, it is possible to arrange a funnel which widens downwards, allowing the liquid-storage container to be filled more simply with liquid after being turned upside-down. Here, "bottom" always means the side which is at the bottom in the use position.

The funnel can be foldable, as known, for example, from camera lens hoods, thus taking up less space after it has fulfilled its task of enabling the liquid-storage container to be filled more easily with liquid.

A further solution according to the invention is distinguished by the fact that the closure has a seal which can be broken open mechanically. This solution will always be preferred when even the complicated seal described above is inadequate.

The closure can here be a film which seals the opening in the bottom and is destroyed by a spike arranged outside the liquid container when the bottom arches outwards. In this way, the liquid in the liquid container is sealed off hermetically prior to use and remains fresh and clean there for years.

Instead of the one film, it would also be possible here to provide a film bag which firmly seals the opening, in which case the films on both sides of the film bag would then be destroyed by the spike. In this way, the material to be brewed can also remain sealed off hermetically for a very long time.

The invention is described below by means of advantageous embodiments, referring to the attached drawings, in which:

FIGS. 1 to 3 show a first embodiment of the container in various working positions during the preparation of the hot drink;

FIGS. 4 to 6 show the container of FIGS. 1 to 3 in various working positions during filling or refilling;

Figure 2:
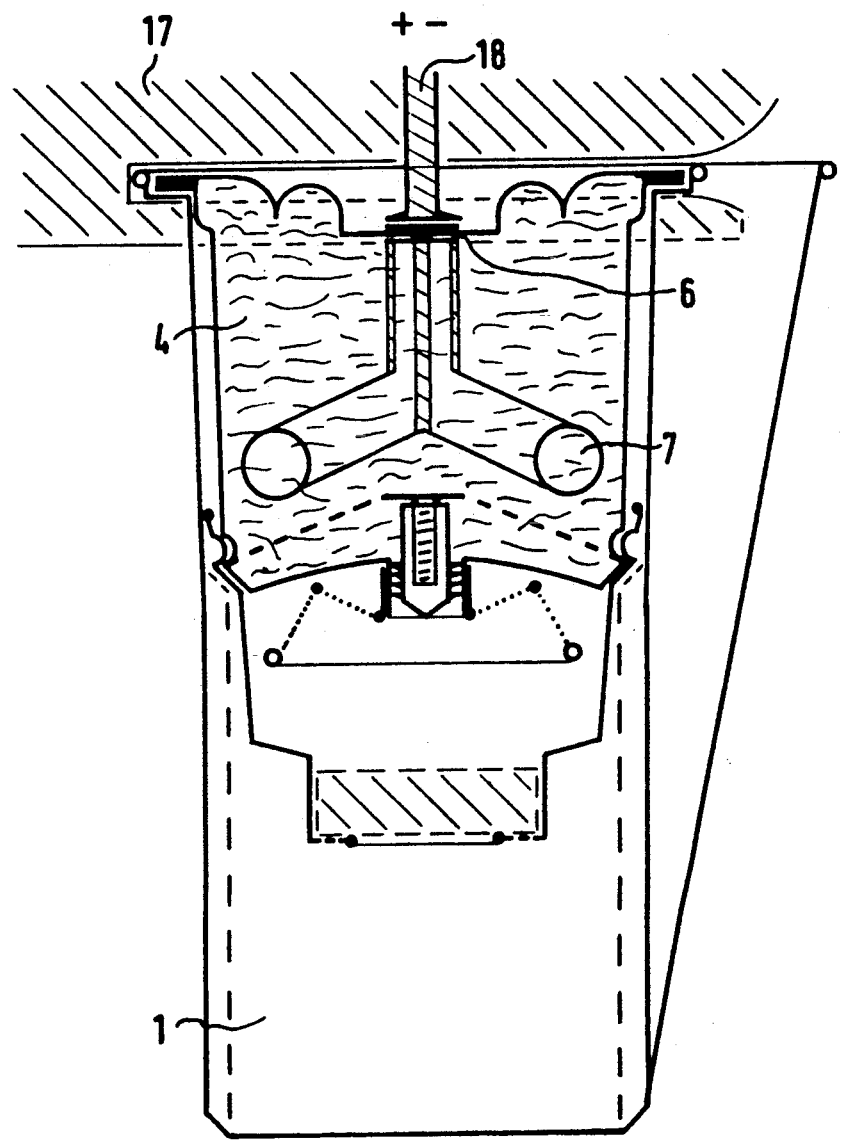

The container of the embodiment of FIGS. 1 to 6 comprises an essentially cylindrical or conical outer container 1, which is provided in the lower part with an insulating wall reinforcement 2 and, on one side, with an extension 3 via which the drink can be consumed.

Inserted into the container 1 is a liquid-storage container 4, which has a bellows-like lid 5 prestressed in such a way that it has a tendency to move from the position of FIG. 1 into the position of FIG. 3 unless it is hindered from doing so by the internal pressure of the liquid in the container 4. Provided on the container are electrical contacts 6 which are electrically connected to heating elements 7, which can be a bare-wire heating coil or an insulated, sheathed heating resistor.

The bottom 8 of the container is arched and has two stable positions, namely the inward-arched position shown in FIGS. 1, 2, 5 and 6 and the outward-arched position shown in FIGS. 3 and 4. When moving between the two stable positions, the bottom 8 is in intermediate positions. In the center, the bottom 8 has a hole which is surrounded by an annular or tubular projection 9. Protruding into this projection 9 is a spike 10, which is fixed by a perforated plate 11 in the interior of the storage container 4. Lip seals 12 are arranged on the spike 10. Also arranged on the projection 9 is a foldable funnel 13, the action of which will be described below.

Placed over the storage container 4 is a cup-shaped element 14 held fast there by a snap-lock connection. At the bottom, the cup 14 has an opening which is partially closed by a screen 15. The material 16 to be brewed is situated above the screen 15.

In FIG. 1, the cup is shown in the filled condition. In the position of FIG. 2, the cup has been pushed into a holding device 17 with a power supply which has a moveable contact 18 which is pressed against the contact 6 when the cup is pushed in, as known from EP-A-0 382 001. The liquid in the storage container 4 is then heated by the heating elements 7, the internal pressure in the container 4 rising gradually as a result. Once a sufficient temperature and hence a sufficient internal pressure has been reached in the container 4, the bottom 8 arches outwards as shown in FIG. 3, into its other stable position. In this process, the tubular projection 9 is released from the spike 10, with the result that the liquid can then penetrate into the collecting space of the container 1 and in the process brews the material 16. Since the internal pressure in the storage container 4 has decreased, the bellows-shaped lid 5 of the container 4 moves downwards in accordance with its prestress, with the result that the electrical connection between the contacts 18 and 6 is interrupted, the heating elements 7 thus no longer being supplied with power. There is therefore no harm in leaving the container 1 in the holding device 17 for a while.

In order to consume the drink, the cup 1 is removed from the holding device 17.

In the embodiment shown in FIGS. 1 to 3, the container essentially comprises three parts, namely the cup 1, the storage container 4 and the cup-shaped part 14. For refilling, these three parts are separated from one another and cleaned. The container 4 is then turned upside-down, as shown in FIG. 4, and the funnel 13 is folded upwards, allowing water to be introduced into the storage container 4 from a tap 19. Once the storage container 4 is full, pressure is exerted on the funnel 13, as shown in FIG. 5. As a result, the funnel 13 is on the one hand folded up, with the result that it takes up less space, and, on the other hand, the bottom 8 is pressed downwards, with the result that the closure comprising the annular projection 9 and the spike 10 is closed again. The bottom 8 reaches its second, inward-arched stable position. The cup-shaped element 14, into which the material 16 to be brewed, in tablet form, has been placed, is mounted on again. The arrangement assembled in this way is then inserted into the outer cup 1, as shown in FIG. 6. One then has the position of FIG. 1 again.

The embodiments of FIGS. 7 to 13 have a similar action and differ essentially only in the design of the bottom 8 or of the closure.

Figure 7:
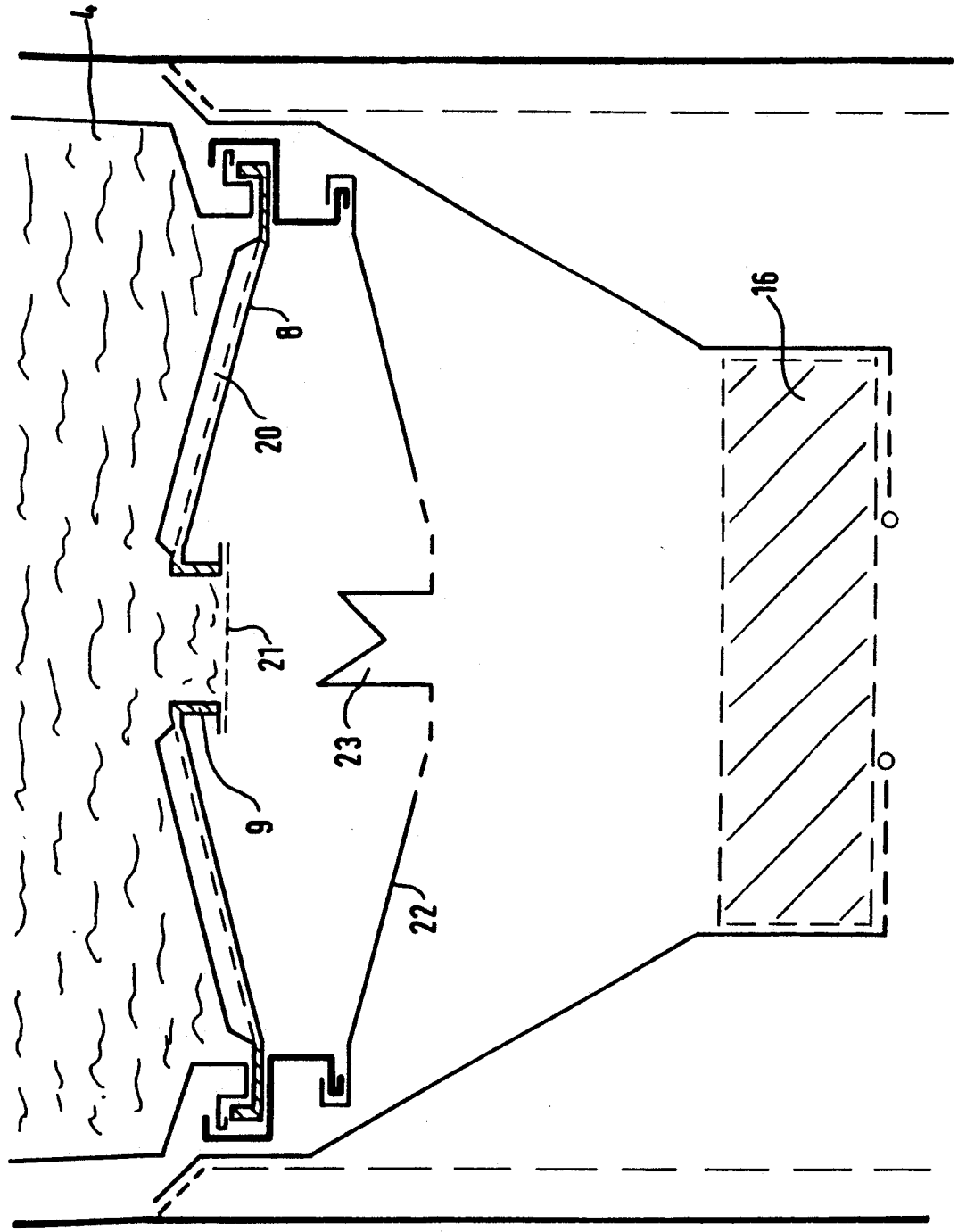
FIG. 7 shows, in a similar view to that in FIGS. 1 to 6, the bottom of the liquid-storage container with a different type of closure.
Figure 8:
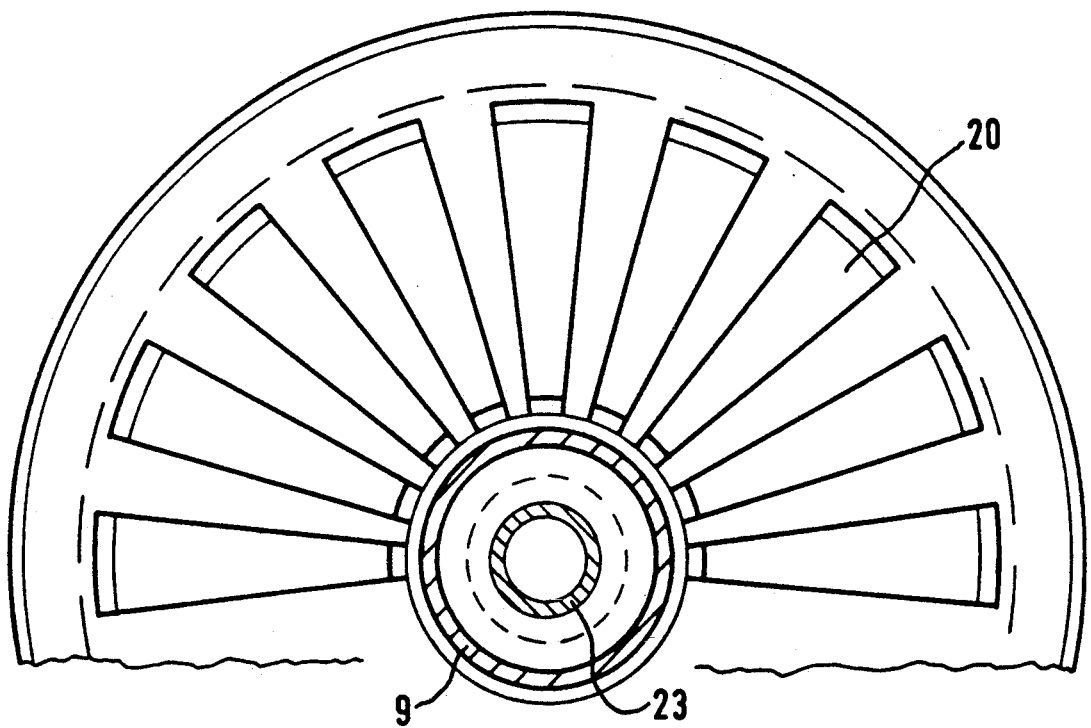
FIG. 8 shows the bottom of the liquid-storage container of the embodiment of FIG. 7 in plan view.
Figure 9:
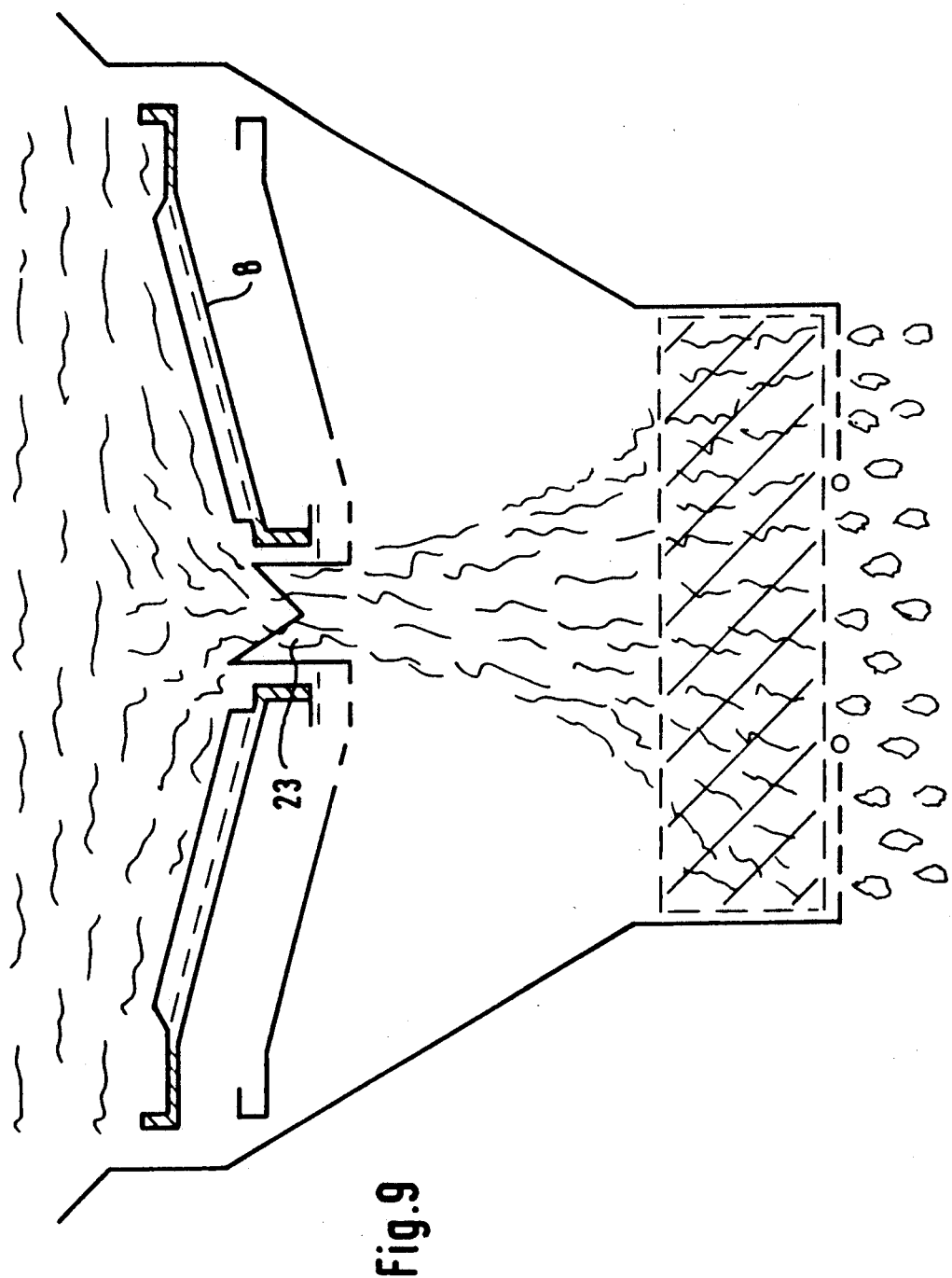
FIG. 9 shows the bottom of the container of FIG. 7 in a position in which the liquid is emerging from the liquid container.

In the embodiment of FIGS. 7 to 9, the bottom has reinforcement zones 20. It furthermore has a central opening with a tubular projection 9 which is sealed with a film 21. Provided underneath the bottom 8, on a plate 22 in the form of a screen, is a spike of cross-shaped construction or the like, with sharp cutting edges. When the bottom moves downwards, as shown in FIG. 9, the fixed spike 23 destroys the film 21, allowing the liquid to pass downwards into the collecting space through the material 16 to be brewed.

Since the container of the invention should expediently be reusable, provision is made here for the bottom 8 to be fixed to the container at the edge in a manner similar to that in which a jam jar is closed. After use, all that is required is that the bottom 8 with the film 21 should be replaced, while the other parts can be reused.

Figure 10:
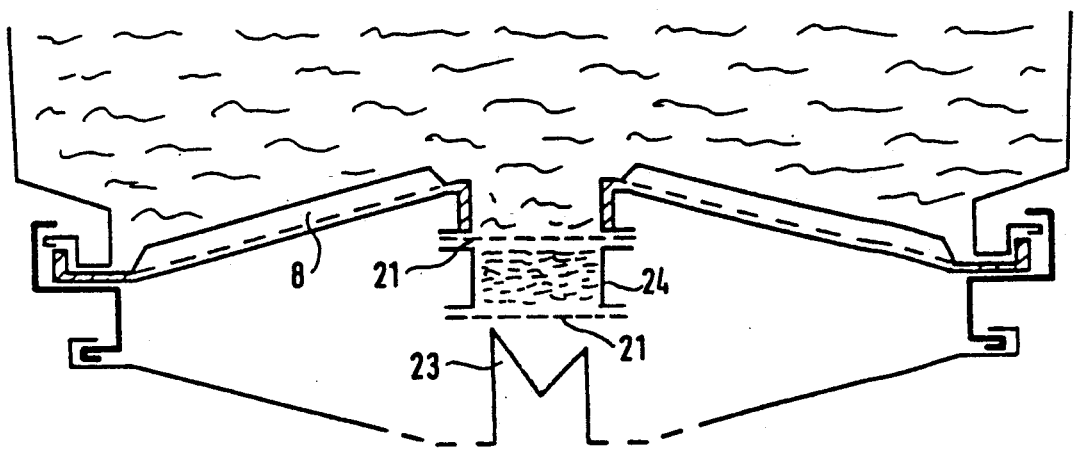
FIG. 10 shows another embodiment similar to that of FIG. 7.

In the embodiment of FIG. 10, two films 21 are provided instead of one film, the said films forming a film bag or sealing both ends of a cylinder 24 arranged on the opening of the bottom 8. When the bottom 8 moves into the downward-arched position, both films 21 are destroyed by the spike 23, allowing the previously hermetically enclosed material to be brewed to be taken along into the collecting space by the hot liquid.

Figure 11:
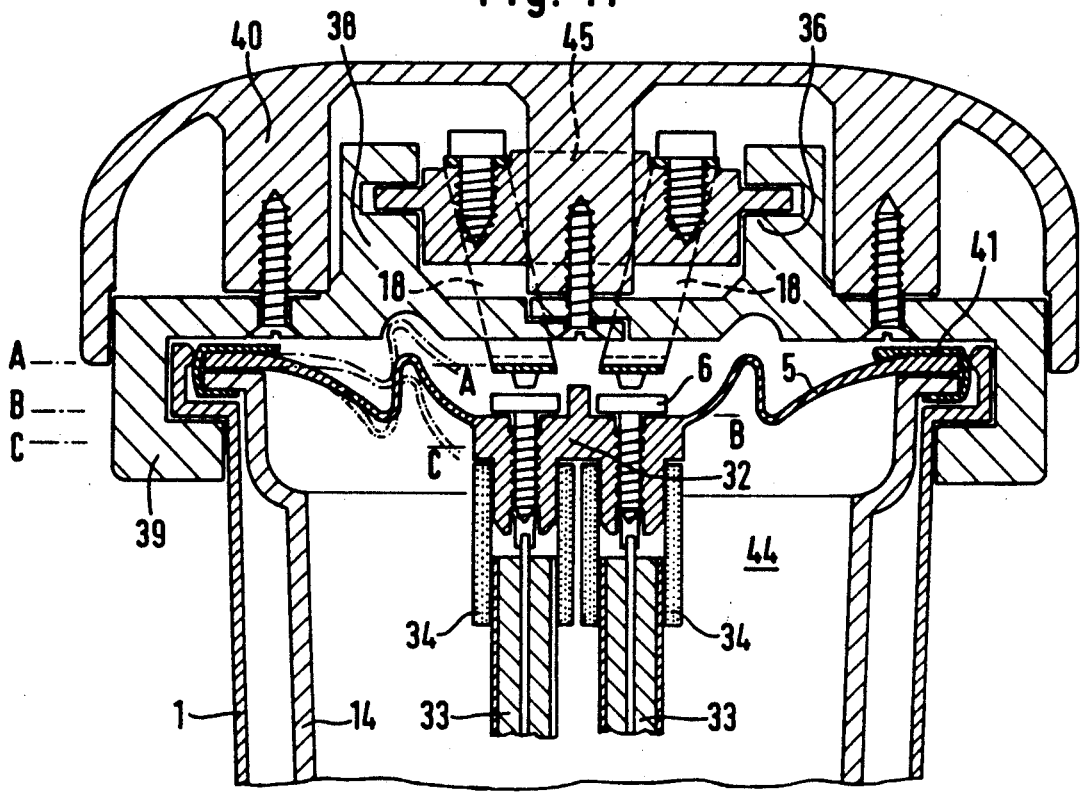
FIG. 11 shows the upper part of the container in cross-section, in an embodiment similar to that in FIGS. 1 to 3, the said upper part being inserted in a holding device.

In FIG. 11, the upper part of the container of another embodiment is shown, which has been pushed into a holding device. The holding device has a holder bottom 38 with a rocker support which has a rocker bearing 36 in which is arranged a switch rocker 45. The holding device is covered by a holder cover 40. The contacts via which the container is supplied with power are designed as spring plates 18 which establish contact with the contact faces 6 of the container. The container is pushed into flanged rails 39 of the holding device, which hold the container firmly against a container-clamping ring 41. The diaphragm-like lid 5 can here assume three positions, denoted by A, B and C. A here denotes the plane of the lid following the heating of the quantity of water introduced, B denotes the plane of the lid in the pre-stressed central position and C denotes the plane of the lid in the relieved production shape. The lid base 32 here indicates the center of the stroke. 33 denotes heating-coil connections which are arranged in tube bushes 34. The wall of the outer cup is denoted by 1, the wall of the inner cup by 14 and the filling space for water by 44.

Figure 12:
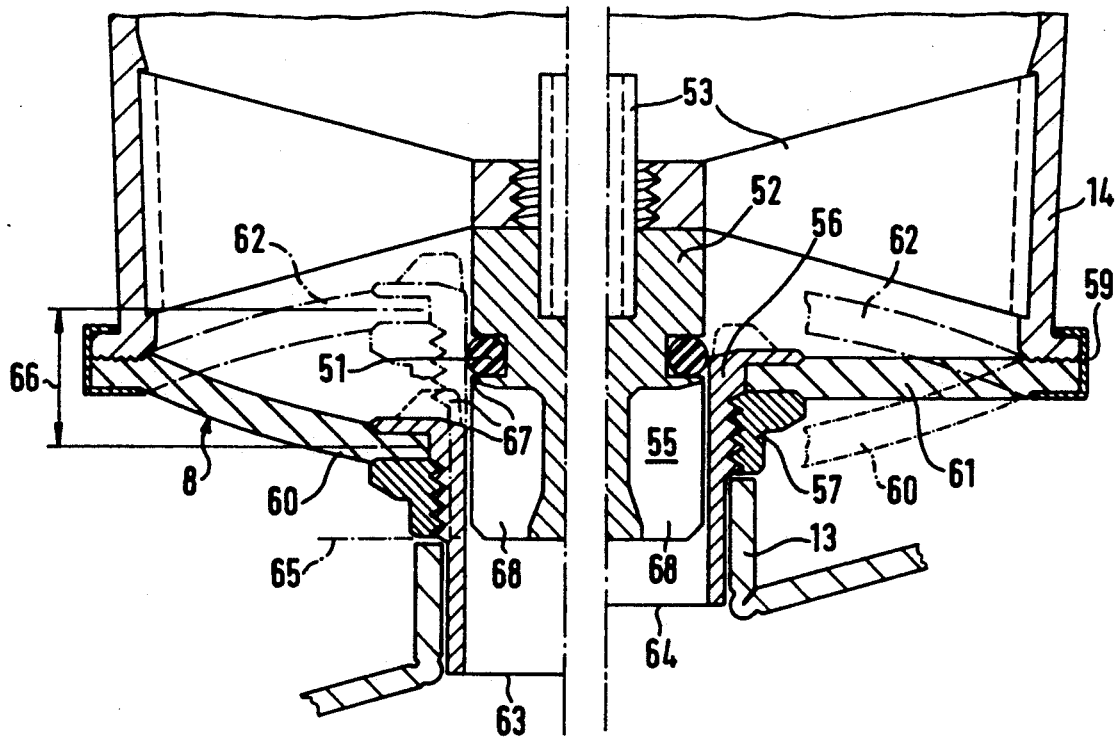
FIG. 12 shows the valve region of a container in an embodiment similar to that of FIGS. 1 to 3, in enlarged representation.

The valve of FIG. 12 has a plunger valve 52 with a threaded stem and four quadrantal inlet and outlet passages 55. The lower part of the plunger valve thus has the cross-sectional shape of a cross. The plunger valve 52 has a rolling/sliding ring 51 which can rest sealingly against the valve cylinder 56. 53 denotes a cross-shaped holding cross-member with a threaded connection bottom for the plunger valve. This holding cross-member rests against the wall of the inner cup 14.

The valve cylinder 56 has fitted vertical stabilising fins and an external thread onto which a lock nut 57 with a flange face is screwed. The flexible diaphragm bottom 8, which is shown in three different positions in the figure, denoted by 60, 61 and 62, is clamped between the valve cylinder 56 and the lock nut 57. In the left-hand representation, the diaphragm bottom 60 here occupies the lowermost position, in which liquid can flow through the valve. In the right-hand part of FIG. 12, the diaphragm bottom occupies the position denoted by 61, in which sealing still just takes place, while, in representation 62, complete sealing would take place. This is the condition which would pertain in the case of the filled container with the container contents not yet heated.

13 denotes the flexible folding funnel, while 59 denotes a bottom-clamping ring by which the bottom 8 or 60, 61, 62 is clamped. 63, 64 and 65 represent the three positions of the valve cylinder, the working stroke being obtained from the spacing of positions 63 and 65. 66 is the travel of the bottom. 67 furthermore denotes an encircling flow sector and 68 denotes lower openings of the inlet and outlet passages.

The container parts 1, 4 and 14 can be composed of plastic, metal or glass. The outer surface of the cup can be corrugated or serrated in order in this way to reduce the area of contact with the human hand and hence the heat transfer. In the embodiments with valve spikes, this can be mounted in a fixed manner but also resiliently. The other surfaces can also be smooth or corrugated or serrated. The various bottoms can here be corrugated or serrated in an annular or radial pattern. If a soup is to be prepared, it is of course possible to dispense with the cup-shaped element 14. The material 16 to be brewed is then arranged directly in the collecting space. As has been stated, the various parts can be connected to one another sealingly by screwed joints, as known from preserving jars. Refilling by the customer or refilling in grocery stores is thereby facilitated, it thus being possible to reuse the containers over and over again.

I claim:

1. A container useful for preparing a hot drink, comprising:
    an upper compartment for heating a liquid, the upper compartment having a side wall and an arched bottom wall having an aperture, the arched bottom wall being movable between a convex position and a concave position relative to the side wall,
    a lower compartment for collecting the hot drink,
    an adjustable closure adapted to separate the upper and lower compartments, the closure being formed by an annular projection surrounding the aperture and by a spike secured in a stationary position within the upper compartment, one of the annular projection and the spike having a seal which engages the other of the annular projection and the spike when the closure is in a closed position, the arched bottom wall being convex relative to the upper compartment side wall when the closure is in a closed position and concave relative to the upper compartment side wall when the closure is in an open position, the bottom wall being configured to be automatically movable from the convex position to the concave position when the liquid storage container reaches a predetermined pressure and being configured to be not automatically movable from the concave position to the convex position.

2. A container according to claim 1, wherein the seal is a lip seal.

3. A container according to claim 1, wherein the seal is a rolling ring seal.

4. A container according to claim 1, further comprising a cup adapted to hold a material to be brewed, the cup being mountable below the closure.

5. A container according to claim 1, wherein the upper compartment is releasably inserted in the lower compartment.

6. A container according to claim 5, further comprising a funnel disposed below the annular projection.

7. A container according to claim 1, wherein the container is adapted to be connected to a heating supply, the heating supply being automatically interrupted when the closure is opened.

8. A container according to claim 1, wherein the annular projection has a length and the closure remains closed as the spike moves along at least a portion of the length of the annular projection.

9. A container according to claim 4, wherein the annular projection has a length and the closure remains closed as the spike moves along at least a portion of the length of the annular projection.

10. A container according to claim 1, wherein the bottom wall is manually movable from the concave position to the convex position.

11. Container for preparing a hot drink, comprising:
    a liquid-storage compartment for heating a liquid, the liquid-storage compartment having a side wall and a bottom wall having an opening therethrough, the bottom wall being automatically movable from a first position through an intermediate position and into a second position when the pressure in the liquid-storage compartment reaches a predetermined pressure and being not automatically movable from the second position into the first position, the bottom wall being arched outwardly relative to the side wall in the second position, the liquid-storage compartment further including a closure having
    an annular projection surrounding the opening in the bottom wall and having a length,
    a spike fixed in the liquid-storage compartment and positioned to be received in the annular projection when the bottom wall is in the first position, the spike having a length, and
    seal means formed on at least a portion of the length of one of the annular projection and the spike, the seal means being configured to slidably engage the other of the annular projection and the spike when the bottom wall is in the first position, to move along at least a portion of the length of the other of the annular projection and the spike when the bottom wall moves between the first position and the intermediate position to prevent the flow of liquid through the opening in the bottom wall, and to be disengaged from the other of the annular projection and the spike when the bottom wall is in the second position to permit the flow of liquid through the opening,
    a collecting compartment positioned to collect the hot drink from the liquid-storage compartment, and
    heating means disposed in the liquid-storage compartment for heating the liquid.

12. Container according to claim 11, further comprising disconnecting means for disconnecting the heating means when the bottom wall of the liquid-storage compartment moves from the first position to the second position.

13. Container according to claim 11, wherein, in the first position, the bottom wall is arched inwardly relative to the side wall.

14. Container according to claim 11, wherein the seal means is formed on the spike.

15. Container according to claim 11, wherein the bottom wall is manually movable from the second position to the first position.

16. Container according to claim 11, wherein the seal means comprises lip seals.

17. Container according to claim 11, wherein the seal means comprises rolling ring seals.

18. Container according to claim 11, wherein a cup-shaped element with a material to be brewed is mounted between the liquid-storage compartment and the collecting compartment.

19. Container according to claim 11, wherein the liquid-storage compartment is inserted releasably into the collecting compartment.

20. Container according to claim 19, further comprising a funnel having a first end connected to the annular projection and an unattached second end.

21. Container according to claim 20, wherein the funnel can be folded up.

* * * * *